United States Patent [19]

Washizu

[11] Patent Number: 5,211,427
[45] Date of Patent: May 18, 1993

[54] PIPING CONNECTOR
[75] Inventor: Katsushi Washizu, Numazu, Japan
[73] Assignee: Usui Kokusai Sangyo Kaisha Ltd., Japan
[21] Appl. No.: 811,792
[22] Filed: Dec. 20, 1991
[30] Foreign Application Priority Data Dec. 22, 1990 [JP] Japan .................. 2-413295
Dec. 22, 1990 [JP] Japan .................. 2-413297

[51] Int. Cl.⁵ ............................................. F16L 55/00
[52] U.S. Cl. .................................... 285/23; 285/305; 285/321
[58] Field of Search ............ 285/305, 321, 23, 307, 285/308

[56] References Cited

U.S. PATENT DOCUMENTS

| | | |
|---|---|---|
| 2,892,991 | 6/1959 | Beebee et al. |
| 3,169,030 | 2/1965 | Lippincott . |
| 3,428,340 | 2/1969 | Pelton .................. 285/321 X |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | De Vincent et al. . |
| 4,074,912 | 2/1978 | Van Bilderbeek et al. . |
| 4,093,279 | 6/1978 | Verdesca et al. ............ 285/23 |
| 4,219,222 | 8/1980 | Brusadin . |
| 4,275,907 | 6/1981 | Hunt . |
| 4,362,323 | 12/1982 | Lodder et al. ............ 285/23 X |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,640,534 | 2/1987 | Hoskins et al. ............ 285/305 X |
| 4,673,199 | 6/1987 | Renfrew . |
| 4,681,351 | 7/1987 | Bartholomew . |
| 4,699,403 | 10/1987 | Wong .................. 285/321 X |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,884,829 | 12/1989 | Funk et al. ............ 285/321 X |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |
| 5,048,875 | 9/1991 | Usui et al. . |
| 5,094,481 | 3/1992 | Takikawa et al. . |
| 5,098,136 | 3/1992 | Washizu . |
| 5,112,084 | 5/1992 | Washizu . |
| 5,114,250 | 5/1992 | Usui . |

FOREIGN PATENT DOCUMENTS

| | | |
|---|---|---|
| 75910 | 6/1953 | Denmark .............. 285/321 |
| 593413 | 5/1959 | Italy . |
| 569915 | 11/1975 | Switzerland ............ 285/305 |
| 855603 | 12/1960 | United Kingdom . |

Primary Examiner—Dave W. Arola
Attorney, Agent, or Firm—Anthony J. Casella; Gerald E. Hespos

[57] ABSTRACT

The piping connector according to the present invention is comprised of a conducting pipe having an annular expanded wall in the proximity of an end part of the pipe, a main body of a joint provided with a structure formed at one end thereof for accepting the conducting pipe thereinto and provided with a circulating hole formed in the axial direction on the other end part thereof in communication with the conducting pipe mentioned above, a sealing means to be fit into the inside area of the main body of the joint, and a retaining means installed inside the main body of the joint, wherein the retaining means mentioned above is comprised of an arm part formed of an elastic body in a shape resembling that of the letter C, and a socket unit comprised of a plurality of suspending parts projecting from the arm part in the direction of the inside diameter and inserted into notched windows formed in the main body of the joint and disposed so as to be put into their direct contact with the annular expanded wall of the conducting pipe, so that the socket unit opens and closes in the radial direction in reaction to the insertion of the conducting pipe and holds the conducting pipe in its proper position in collaboration with the main body of the joint. Further, the construction of the piping connector may be effectively modified within the technical scope of the present invention as described in the present Specification.

7 Claims, 6 Drawing Sheets

– 5,211,427 –

PIPING CONNECTOR

BACKGROUND OF THE INVENTION

1. Field of the Invention

The present invention relates to a connector for use in connecting metal pipes or resin pipes (hereinafter referred to as "conducting pipes") which are in a relatively small diameter on the order of approximately 20 mm in pipe diameter and arranged to form a feeding channel for supplying oil or supplying air or gas generally to automobiles or to various types of machines, equipments, or the like.

2. Description of the Prior Art

The conventional piping connector of this kind is constructed in such a manner, as disclosed, for example, in the Japanese Patent Publication No. 10711-Showa 64 (1989), that a retaining element is inserted into a housing (the main body of a joint), the jaw-form end part of the retaining element being subsequently thrust open outwards by the annular surface of a conducting pipe as the conducting pipe is inserted, the jaw-form end part of the retaining element thus permitting the insertion of the conducting pipe, and the jaw-form end part of the retaining element then moving inwards to resume its original position upon the passage of the annular surface means of the conducting pipe through the jaw-form end part mentioned above, thereby getting into its direct contact with a suspending wall formed on the conducting pipe and thereby securing the conducting pipe so as to prevent the pipe from falling out.

However, the conventional piping connector described above presents the problem that the joint of the connector as a whole has a large size because the connector requires a larger diameter of its retaining device as compared with that of the conducting pipe in order to ensure a proper snapping action of the elastic claws of the retaining device at the time when a conducting pipe is inserted into the retaining device and also because the connector requires an extended length for the same reason, so that the piping connector is hard to set in a narrow space.

SUMMARY OF THE INVENTION

The object of the present invention is, therefore, to offer a piping connector which has a small connector diameter and a small overall length and is thus convenient for its arrangement.

In order to attain the object mentioned above, a first mode of preferred embodiments of a piping connector according to the present invention offers a piping connector comprised of a conducting pipe having an annular expanded wall in the proximity of an end part of the pipe, a main body of a joint provided with a structure formed at one end thereof for accepting the above-mentioned conducting pipe thereinto and provided with a circulating hole formed in the axial direction on the other end part thereof and to be set into communication with the conducting pipe mentioned above, a sealing means to be fit into the inside area of the main body of the joint, and a retaining means installed inside the main body of the joint, wherein the retaining means mentioned above is comprised of an arm part, which is formed of an elastic body in a shape resembling that of the letter C, and a socket unit, which is comprised of a plurality of suspending parts projecting from the above-mentioned arm part in the direction of the inside diameter, being inserted into a notched window formed in the above-mentioned main body of the joint, and being disposed so as to be put into their direct contact with the annular expanded wall of the conducting pipe mentioned above, so that the socket unit opens and closes in the radial direction by the insertion of the conducting pipe and holds the conducting pipe in collaboration with the main body of the joint.

Furthermore, a third mode of preferred embodiments of a piping connector according to the present invention offers a piping connector comprised of a conducting pipe having an annular expanded wall in the proximity of an end part of the pipe, a sealing means to be set in the inside area of the main body of the joint provided with a structure formed at one end thereof for accepting the above-mentioned conducting pipe inserted thereinto and provided with a circulating hole formed in the axial direction on the other end part thereof to secure communication between the two parts, a sleeve set in the rear part of the main body of the joint, and a retaining means installed inside the main body of the joint, wherein the sleeve is constructed in such a way that it has a certain predetermined length, is housed inside the main body of the joint, and is capable of sliding in the axial direction on the conducting pipe, and has an outside diameter slightly larger than the diameter of the annular expanded wall. In the meanwhile, the retaining means mentioned above is comprised of an arm part, which is formed of an elastic body in a shape resembling that of the letter C, and a socket unit, which is comprised of a plurality of suspending parts holding the above-mentioned conducting pipe between them, with the socket unit being inserted into a notched window in the main body of the joint, with the sleeve being set in its engagement with the suspending parts in the socket unit prior to the insertion of the conducting pipe, and with the socket unit being set in its open state in its position, so that the expanded wall moves together with the sleeve in the axial direction inside the socket unit when the conducting pipe is inserted into the main unit of the joint and thereby closes the socket unit.

Also, the above-mentioned socket unit may be constructed with the arm part and suspending part of the socket formed of a bent wire spring, a sleeve made in the form of a staged sleeve having an enlarged diameter part formed in the rear end part of the sleeve for accommodating the annular expanded wall, a tapered part formed on the outer circumference between the enlarged diameter part and the smaller diameter part, and an engaging groove provided at the root of the tapered part for the engagement of the suspending part.

Furthermore, it is also feasible to form a construction in which a spacer having an enlarged diameter part for accommodating the above-mentioned annular expanded wall and a seal ring or the like to be set in a position subsequent to the enlarged diameter part are fixed rigidly between the annular expanded wall on the conducting pipe and a stopper provided in the proximity of the end part of the conducting pipe and the sleeve is constructed with an outside diameter equal to the diameter of the enlarged diameter part of the spacer and made to slide over the small diameter part of the spacer mentioned above, so that the sleeve is first engaged with the suspending part of the socket prior to the insertion of the conducting pipe, and then the socket unit moves from the sleeve to the enlarged diameter part of the spacer when the sleeve moves in the axial direction inside the socket, being thrust by the enlarged diameter part of the spacer by the effect of the insertion of the conducting pipe, the sleeve closing as it gets out of its engagement with the socket unit and securing the conducting pipe in the main body of the joint in collaboration with the annular expanded wall of the conducting pipe.

The present invention offers a piping connector which is constructed in the manner described above, and, in a preferred embodiment of the invention, a conducting pipe is inserted from the rear of the main body of a joint for the assembly of the conducting pipe, and an expanded wall on the conducting pipe pushes the tapered part of the suspending part installed on the socket unit and thereby pushes the socket unit open in the radial direction. Then, the socket unit resumes its original form by the elasticity of the arm part when the conducting pipe has passed over the expanded wall, and the conducting pipe is connected by the engagement of the above-mentioned expanded wall with the engaging wall of the suspending part.

Also, another example of preferred embodiments of the present invention offers a construction of a piping connector in which a sleeve is first set in its engagement with the suspending part of the socket unit before a conducting pipe is set in the main body of the joint, the socket unit being thereby set in its open state, so that the annular expanded wall is inserted while it thrusts the sleeve when the conducting pipe is inserted into the inside of the main body of the conducting pipe. Then, when the annular expanded wall passes, together with the sleeve, through the inside of the socket unit, the annular expanded wall is released from its engagement with the socket unit, so that the socket unit is closed and the conducting pipe is therefore retained in the main body of the joint.

DETAILED DESCRIPTION OF PREFERRED EMBODIMENTS

Figure 1:
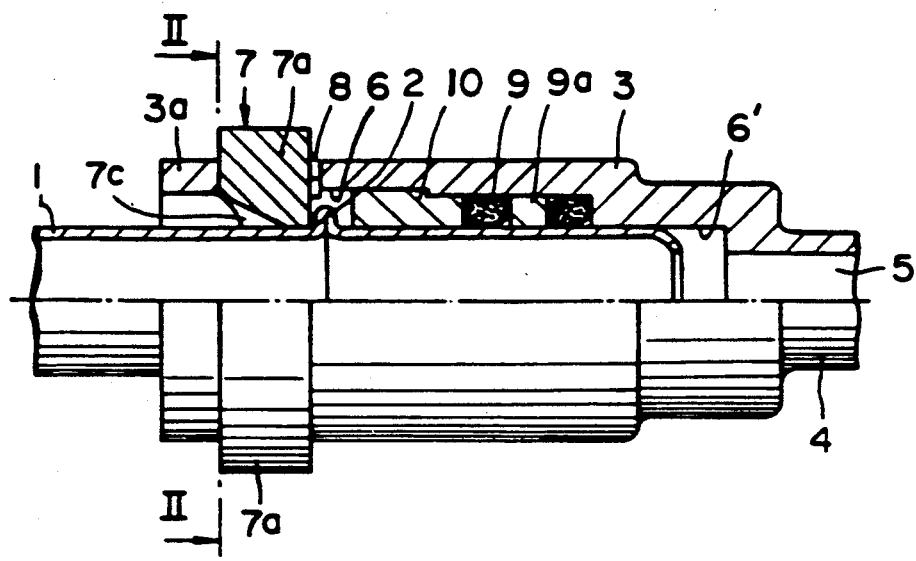
FIG. 1 presents a sectional view illustrating the state of connection of the piping connector according to the present invention and presents a section of the part of the piping connector indicated with the arrow marks I—I in FIG. 2.

Now, a detailed description will be made of the construction according to the present invention as illustrated in the accompanying drawings, in which identical or corresponding parts are designated by identical reference numbers throughout the several drawings.

First, in the examples of preferred embodiments shown in FIG. 1 through FIG. 6, the reference number 1 designates a conducting pipe, which has an annular expanded wall 2 formed with an outward expansion and provided in the proximity of the connecting end part at the side of the conducting pipe when the pipe is connected. The reference number 3 denotes the main unit of a joint, and a small diameter chamber 6' formed in a progressively expanding diameter in communication with a circulating hole 5 formed in the cylindrical connecting wall 4 made of a resin tube or the like (a part at the top end of the cylindrical connecting wall 4 is omitted from the drawings) is provided through the top end part in the inside of the shaft core of the main unit of the joint, and an enlarged diameter chamber 6 is provided behind the small diameter chamber 6', and also a notched window 8 into which a socket unit 7 to be described later is inserted is provided in the circumferential wall part formed with the enlarged diameter chamber 6, and the circumferential part at the rear end part of the main unit of the joint is formed into a suspending support wall 3a, with a plurality of elastic seal ring members 9 made of rubber or the like being provided at the side of the small diameter chamber 6' with a spacer 9a set between them and with a sleeve 10 being inserted behind the elastic seal ring member 9. The socket unit 7 is constructed in an integrated structure comprised of an arm part 7a, which is made of an elastic body such as resin and formed in a shape resembling that of the letter C, and a plurality of block-shaped suspending parts 7b (provided in a total of three pieces at intervals of 120 degrees in the drawings) which protrude from this arm part in the direction of the inside diameter and are so arranged as to hold the outer circumference of the conducting pipe between them when the conducting pipe 1 is connected to the socket unit 7, which is inserted into the above-mentioned notched windows 8 provided in a number equal to that of the suspending parts 7b. The suspending parts 7b are provided with tapered parts 7c opening into the rear area and getting into direct contact with the annular expanded wall 2, thereby thrusting the suspending parts 7b open, when the conducting pipe 1 is inserted into the socket unit 7, so that the suspending parts 7b maintain their engagement with the annular expanded wall 2, thereby preventing the conducting pipe 1 from falling out of its proper position.

Figure 3:
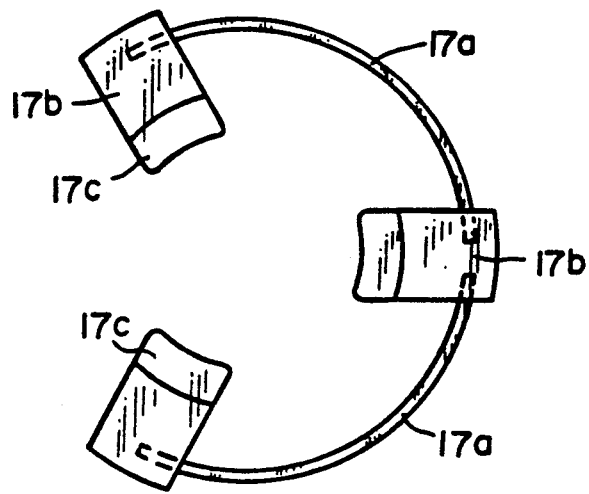
FIG. 3 presents a side view illustrating another example of preferred embodiments of the present invention.
Figure 4:
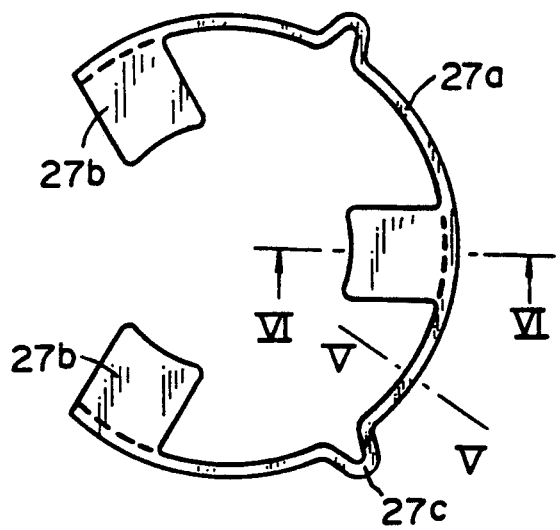
FIG. 4 presents a side view illustrating still another example of preferred embodiments of the present invention.
Figure 5:
FIG. 5 presents a sectional view of the construction taken along the line indicated with the arrow marks V—V in FIG. 4.
Figure 6:
FIG. 6 presents a sectional view of the construction taken along the line indicated with the arrow marks VI—VI in FIG. 4.

FIG. 3 present a side view illustrating another example of preferred embodiments of a socket unit according to the present invention. The socket unit may be constructed in an integrated structure formed with a spring-tempered plate spring or wire spring made of stainless steel and set in the arm part 17a formed approximately in the shape of the letter C and with suspending parts 17b made of resin. Also, the socket unit may be constructed in an integrated structure with an arm part 27a formed of a plate spring made of SK5 in the shape of the letter E and bent in a shape approximately identical to that of the letter C and with suspending parts 27b formed of the three protruding parts of the plate spring bent in a tapered form in the direction of the inside diameter. In this regard, it is recommended to form the respective top ends of the suspending parts 27b in an arc shape and to bend the top ends inwards to form a taper (refer to FIG. 6) in order that the suspending parts 27b may secure the conducting pipe 1 and may also be reinforced thereby. Also, a bent part 27c formed on the arm part 27a will further improve the insertability of the conducting pipe 1. Moreover, FIG. 5 presents a sectional view of the construction taken along the line indicated with the arrow marks V—V in FIG. 4, and FIG. 6 is a sectional view of the construction taken along the line indicated with the arrow marks VI—VI in FIG. 4.

Next, a description will be made of the examples of preferred embodiments of the present invention illustrated in FIG. 7 through FIG. 17.

In these examples of preferred embodiments, the component parts other than the sleeve and the socket unit, which are to be described later, are approximately identical in their construction to the corresponding parts in the examples of preferred embodiments described above with reference to their illustrations in FIG. 1 through FIG. 6.

Now, in the examples of preferred embodiments shown in FIG. 7 through FIG. 17, a sleeve 10, which slides over a conducting pipe 1, has an inside diameter suitable for the sliding movement and has an outside diameter approximately equal to or slightly larger than the outside diameter of the annular expanded wall 2 and has a shape suitable for its passage in the inside of the enlarged diameter chamber 6. In the meanwhile, a socket unit 7 made of such elastic material as resin is provided with an arm part 7a formed in a shape approximately identical to that of the letter C and three suspending parts 7b installed for example at intervals of 120 degrees for holding the conducting pipe 1 between them, and the socket unit 7 is to be set in its position by inserting the suspending parts 7b into notched windows 8 formed in the main unit 3 of a joint.

Moreover, the socket unit 7 may be constructed in an integrated structure with an arm part 7a formed of a plate spring or a wire spring and with suspending parts 7b made of resin material, in the same way as in the construction shown in FIG. 3.

Figure 9:
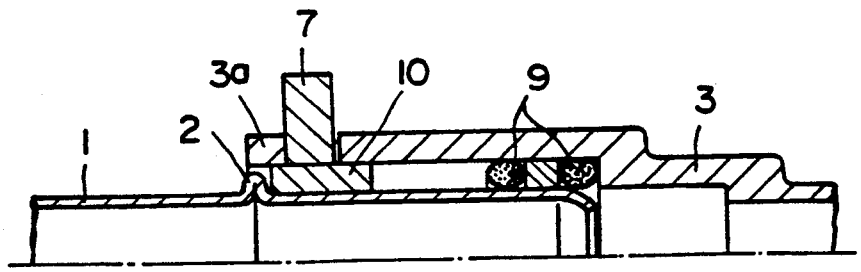
FIG. 9 presents a sectional view illustrating the principal parts of the piping connector in the process of its assembly.

A piping connector constructed as described above is to be set in advance with a sleeve 10 in engagement with the suspending parts 7b of the socket unit 7 and with the socket 7 in its state of opening to form a diameter approximately equal to that of the annular expanded wall 2 of the conducting pipe 1, as illustrated in FIG. 9.

Next, the conducting pipe 1 is inserted into the inside of the main unit 3 of the joint, when the sleeve 10 moves in the axial direction, being thrust with the annular expanded wall 2, and, when the annular expanded wall 2 mentioned above has passed through the inside of the socket unit 7, the socket unit 7 closes (refer to FIG. 7) and holds the conducting pipe 1 inside the main unit 3 of the joint in collaboration with the annular expanded wall 2 of the conducting pipe 1.

Now, another example of preferred embodiments of the piping connector according to the present invention will be described with reference to FIG. 10 through FIG. 13. The socket unit 37 is constructed with an arm part 37a and suspending parts 37b, which are formed of a wire spring made of spring-tempered stainless steel as bent in the manner shown in these drawings.

This construction makes it possible to form the socket unit 37 in a small outside diameter and to permit the insertion of the conducting pipe with a small inserting force. However, as instability occurs in holding the socket unit in a stable state on the sleeve prior to the insertion of the conducting pipe, these examples of preferred embodiments feature an enlarged diameter chamber 20a formed in the rear end of the sleeve 20 and capable of accommodating the annular expanded wall 2, so that the socket unit 37 may be inserted into the main unit 3 of the joint, and a tapered part 20b is provided additionally between the small diameter parts, and a suspending groove 20c where the socket unit 27 is to be suspended is formed at the root of the tapered part 20b. In this case, the suspending parts 37b of the socket unit 37 are held in the suspending groove 20c of the sleeve 20 mentioned above prior to the insertion of the conducting pipe.

Figure 12:
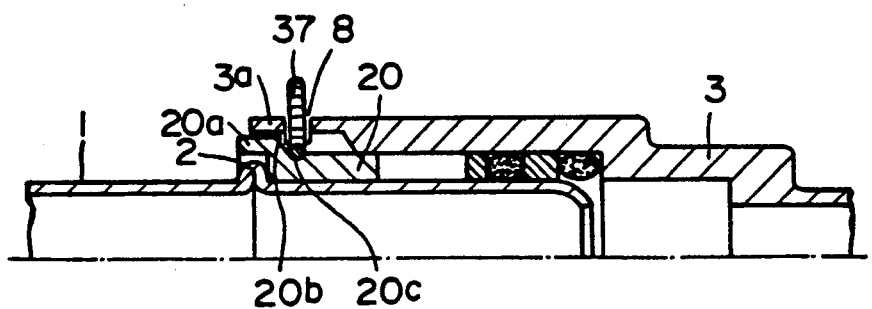
FIG. 12 presents a sectional view of the principal parts of the piping connector in the state prior to its assembly.

As regards the inserting operation, the conducting pipe 1 is first inserted in the state illustrated in FIG. 12, and the sleeve 20 is moved in the axial direction, being thrust as the annular expanded wall 2 gets into the inside area of the enlarged diameter part 20a of the sleeve 20. At such a time, the socket 37 is expanded by the tapered part 20b (refer to FIG. 13), and the conducting pipe 1 passes, together with the annular expanded wall 2, through the inside area of the socket unit 37, and the socket unit 37 closes thereupon (refer to FIG. 13) and holds the conducting pipe 1 inside the main unit 3 of the joint in collaboration with the annular expanded wall 2.

Next, FIG. 14 through FIG. 17 illustrate still another example of preferred embodiments of the present invention, and it is the object of these Figures to allow a check on the state of the seal ring prior to the assembly of the conducting pipe. As shown in these Figures, a spacer 31 having an enlarged diameter part 31a, which accommodates the annular expanded wall 2 mentioned above, and a plural number of subsequently positioned seal rings 9 and a spacer 9a are arranged and installed in the space between the annular expanded wall 2 formed on the conducting pipe 1 and a stopper 2a provided in the proximity of an end part of the conducting pipe 1. Then, a sleeve 30, which slides over the small diameter part of this spacer 31, is to be installed, and the sleeve 30 should have an outside diameter equal to the diameter of the enlarged diameter part 31a of the spacer 31 and should have such a length that the spacer 31 and the sleeve 30 positioned in proximity to each other stop in the inside of the main unit 3 of the joint and the rear end of the enlarged diameter part 31a of the spacer 31 moves beyond the front area of the socket 7. Moreover, the sleeve 30 has a shape ensuring ease in inserting it into the inside area of the main unit of the joint and into the spacer 31.

Figure 16A:
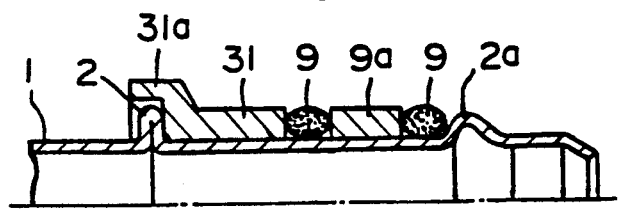
FIG. 16 presents a sectional view illustrating the state of the piping connector prior to its assembly.
Figure 16B:
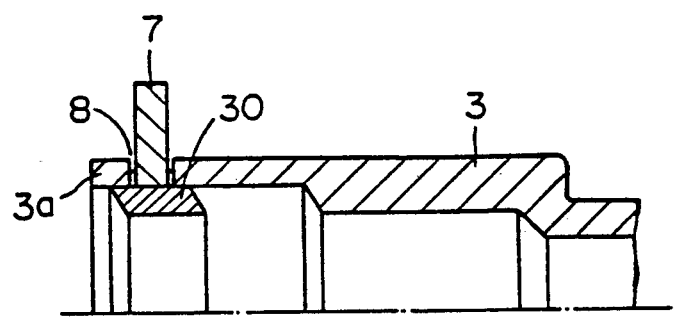

Next, the assembling operations for the piping connector will be described below. As illustrated in FIG. 16, the sleeve 30 is inserted in advance into the socket unit 7, so that the socket unit 7 is thereby expanded. Then, the conducting pipe 1 on which the spacer 31, the seal ring 9, and so forth are arranged is inserted into the sleeve 30 in the main unit 3 of the joint and the sleeve 30 is pushed in, together with the enlarged diameter part 31a of the spacer 31. Then, the rear end of the enlarged diameter part 31a and socket unit 7 are released from their engagement, upon which the socket unit 7 closes and holds the conducting pipe 1 in the main unit 3 of the joint in collaboration with the annular expanded wall 2.

As described hereinabove, the piping connector according to the present invention is comprised of an arm part formed in a shape approximately identical to that of the letter C and a plurality of suspending parts protruding in the direction of the inside diameter of this arm part and is designed to be installed in the notched windows formed in the main unit of the joint, and the construction of the piping connector according to the present invention can therefore produce the advantage that it can be constructed in a small diameter and in a small overall length to achieve improved convenience and efficiency in the installation of the piping conductor.

In addition, the construction of the piping connector according to the present invention, which permits the insertion of the conducting pipe into the connector while the retaining means is in its open state, can accept the conducting pipe inserted into its position with a small inserting force and also allows the production of the socket unit at a moderate cost and in a more compact size.

Furthermore, the construction of the piping connector according to the present invention permits a check on the state of the seal ring prior to the assembly of the conducting pipe, so that it will be possible to prevent troubles due to damages on the seal ring or the lack of any necessary component parts, and, as the conducting pipe is inserted into the main unit of the joint while the retaining means is in its open state, the construction of the piping connector can prevent the damages otherwise likely to be caused to the seal ring at the time of its assembly.

DRAWINGS

Figure 2:
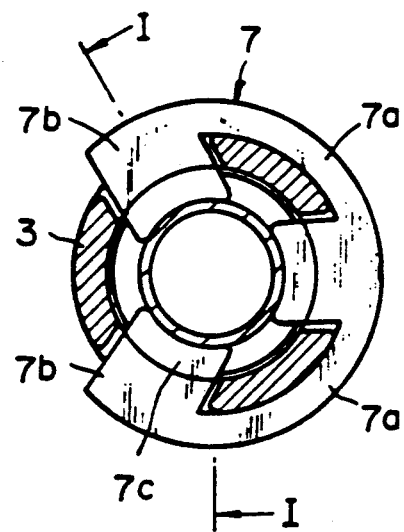
FIG. 2 presents a sectional view illustrating the state of the piping connector according to the present invention in its section along the line indicated with the arrow marks II—II in FIG. 1.
Figure 7:
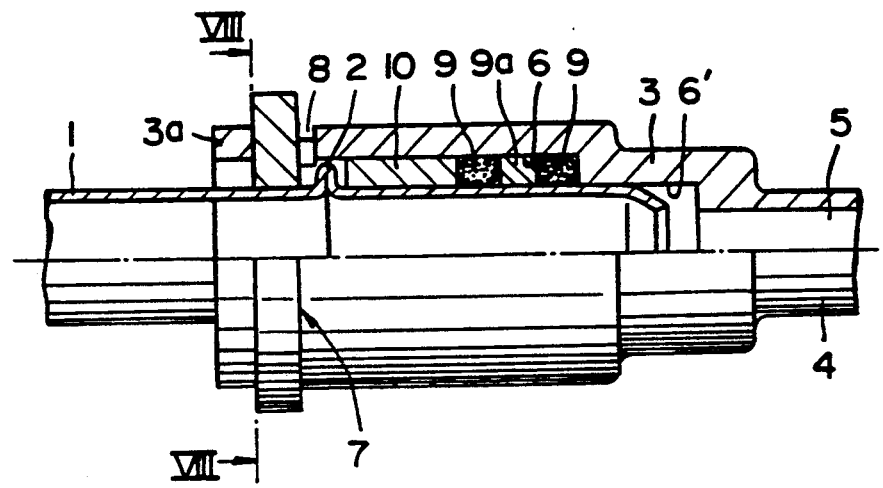
FIG. 7 presents a sectional view of the section of a piping connector as taken along the line indicated with the arrow marks VII—VII in FIG. 8, which shows still another example of embodiments of the piping connector according to the present invention.
Figure 8:
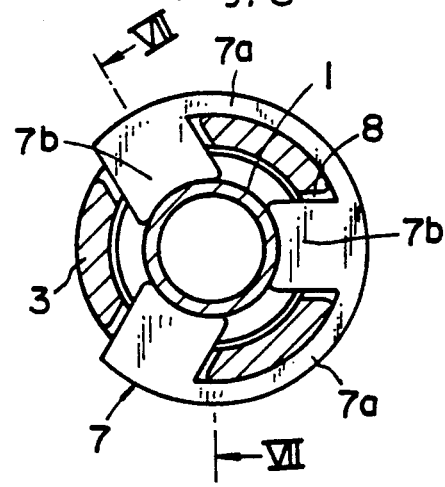
FIG. 8 presents a sectional view of the section of the piping connector as taken along the line indicated with the arrow marks VIII—VIII in the construction of the piping connector shown in the example of embodiment of the present invention in FIG. 7.
Figure 10:
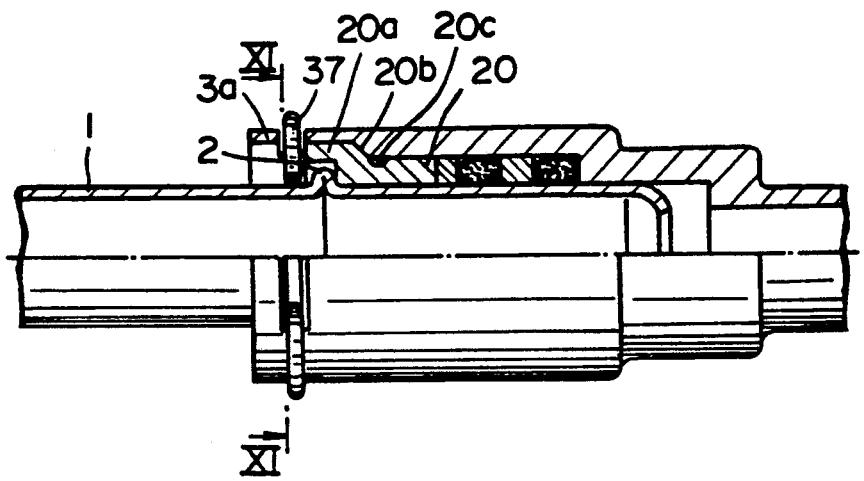
FIG. 10 presents a sectional view of the section of the piping connector as taken along the line indicated with the arrow marks X—X in the construction shown in FIG. 11, which illustrates another example of preferred embodiments of the present invention.
Figure 11:
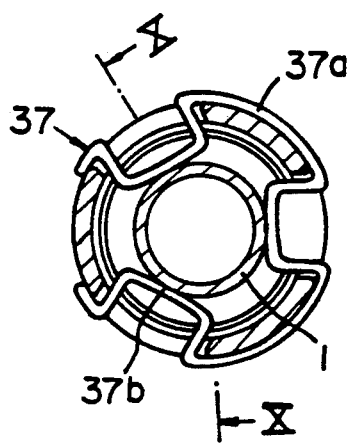
FIG. 11 presents a sectional view of the section of the piping connector as taken along the line indicated with the arrow marks XI—XI in the construction shown in FIG. 10.
Figure 13:
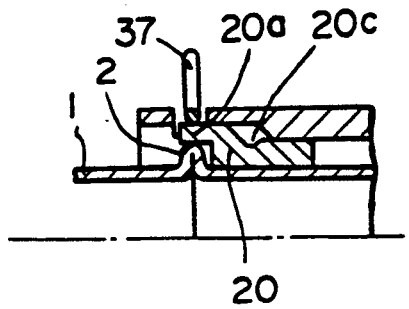
FIG. 13 presents a magnified view of the principal parts of the piping connector in the process of its assembly.
Figure 14:
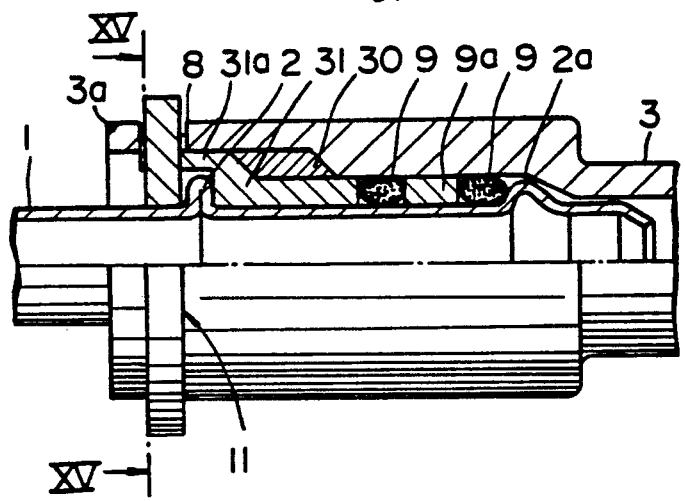
FIG. 14 presents a sectional view of the piping connector as taken along the line indicated with the arrow marks XIV—XIV in FIG. 15, which similarly illustrates still another example of preferred embodiments of the present invention.
Figure 15:
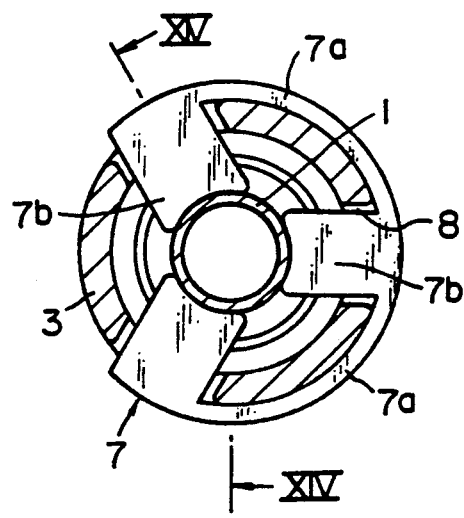
FIG. 15 presents a sectional view of the piping connector as taken along the line indicated with the arrow marks XV—XV in the construction shown in FIG. 14.
Figure 17:
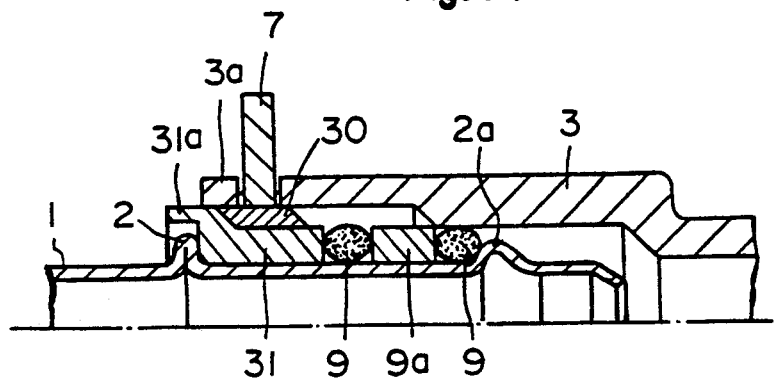
FIG. 17 presents a sectional view illustrating the state of the piping connector in the process of its assembly.

FIG. 1
1) Conducting pipe
2) Annular expanded wall
3) Main unit of joint
3a) Suspending support wall
4) Cylindrical connecting pipe wall
5) Circulating hole
6) Enlarged diameter chamber
6') Small diameter chamber
7) Socket unit
7a) Arm member
7a) Arm member
7c) Tapered part
8) Notched window
9) Sealing member
9a) Spacer
10) Sleeve
FIG. 2
3) Main unit of joint
7) Socket member
7a) Arm member
7a) Arm member
7b) Suspending member
7b) Suspending member
7c) Tapered part
FIG. 3
17a) Arm part
17b) Suspending parts
17a) Arm part
17b) Suspending parts
17c) Tapered part
17c) Tapered part
FIG. 4
27a) Arm part
27b) Suspending parts
27a) Arm part
27b) Suspending parts
27c) Bent part
FIG. 5
27a) Arm part
FIG. 6
27a) Arm part
27b) Suspending parts
FIG. 7
2) Annular expanded wall
3) Main unit of joint
3a) Suspending support wall
4) Cylindrical connecting wall
5) Circulating hole
6) Enlarged diameter chamber
6') Small diameter chamber
7) Socket unit
8) Notched window
9) Elastic seal ring member
9a) Spacer
10) Sleeve
FIG. 8
1) Conducting pipe
3) Main unit of the joint
7) Socket unit
7a) Arm part
7b) Suspending parts
7a) Arm part
7b) Suspending parts
8) Notched window
FIG. 9
1) Conducting pipe
2) Annular expanded wall
3) Main unit of the joint
3a) Suspending support wall
7) Socket unit
9) Elastic seal ring member
10) Sleeve
FIG. 10
1) Conducting pipe 2) Annular expanded wall
3a) Suspending support wall
20) Sleeve
20a) Enlarged diameter part
20b) Tapered part
20c) Suspending groove
37) Socket unit
   FIG. 11
1) Conducting pipe
37) Socket unit
37a) Arm part
37b) Suspending parts
   FIG. 12
1) Conducting pipe
2) Annular expanded wall
3) Main unit of joint
3a) Suspending support wall
8) Notched window
20) Sleeve
20a) Enlarged diameter part
20b) Tapered part
20c) Suspending groove
37) Socket unit
   FIG. 13
1) Conducting pipe
2) Annular expanded wall
20) Sleeve
20a) Enlarged diameter part
20c) Suspending groove
37) Socket unit
   FIG. 14
1) Conducting pipe
2) Annular expanded wall
3) Main unit of joint
2a) Stopper
3a) Suspending support wall
7) Socket unit
8) Notched window
9) Elastic seal ring member
9) Elastic seal ring member
9a) Spacer
30) Sleeve
31) Spacer
31a) Enlarged diameter part
   FIG. 15
1) Conducting pipe
3) Main unit of joint
7) Socket unit
7a) Arm part
7b) Suspending part
7a) Arm part
7b) Suspending part
8) Notched window
   FIG. 16
1) Conducting pipe
2) Annular expanded wall
2a) Stopper
9) Elastic seal ring member
9a) Spacer
31) Spacer
31a) Enlarged diameter part
3) Main unit of joint
3a) Suspending support wall
7) Socket unit
8) Notched window
30) Sleeve
   FIG. 17
1) Conducting pipe
2) Annular expanded wall
2a) Stopper
3) Main unit of joint
3a) Suspending support wall
7) Socket unit
9) Elastic seal ring member
9) Elastic seal ring member
9a) Spacer
30) Sleeve
31a) Enlarged diameter part

I claim:

1. A piping connector comprised of a conducting pipe having an annular expanded wall in proximity of an end part thereof, a joint body having opposed ends and configured for accepting the conducting pipe in one said end and having a circulating hole at the other end thereof, said circulating hole being in communication in the axial direction from one end to the other end of the joint body, a seal provided in the joint body, and a socket unit installed inside the joint body and coacting means between said joint body and said socket unit for limiting relative axial movement therebetween wherein said socket unit is comprised of a C-shaped arm made of an elastic material and a plurality of tapered block-shaped parts forming a closed surface with said c-shaped arm and protruding inwardly from said C-shaped arm and being dimensioned for engaging the annular expanded wall of the conducting pipe after the insertion of the conducting pipe into the joint body, said block-shaped parts holding the conducting pipe in collaboration with the joint body.

2. A piping connector according to claim 1, wherein the socket unit is constructed in an integrated structure with the arm made of a plate spring and with the block-shaped parts made of a resin.

3. A piping connector according to claim 1, wherein the socket unit is constructed in an integrated structure with the arm made of a wire spring and with the block-shaped parts made of resin.

4. A piping connector comprised of a conducting pipe having an annular expanded wall in proximity of an end part thereof, a joint body having opposed front and rear ends, a chamber extending into the rear end dimensioned for accepting the conducting pipe and having a circulating hole at the front end thereof, said circulating hole being in communication with the chamber, a seal means provided in the joint body, a sleeve installed in the rear end of the joint body, and a socket unit installed inside the joint body, wherein said sleeve slides in the axial direction on the conducting pipe, and is formed in an outside diameter at least approximately equal to the diameter of the annular expanded wall, the socket unit being comprised of a C-shaped arm made of an elastic material and a plurality of suspending parts protruding in the direction of the inside diameter of the arm and holding the conducting pipe between the sleeve and the suspending parts of the socket unit, the said socket unit being inserted in notched windows formed in the joint body, whereby the sleeve is initially set in engagement in the inside of the socket unit and the socket unit is assembled in its open state prior to the insertion of the conducting pipe, and whereby the expanded wall of the conducting pipe moves the sleeve in the axial direction inside the socket in reaction to the insertion of the conducting pipe and thereby enables the elastic material of the arm to close the socket unit.

5. A piping connector according to claim 4, wherein the arm part and suspending parts of the socket unit are formed from a wire spring, and wherein the sleeve includes a small diameter front part and an enlarged diameter rear part with an inside diameter capable of accommodating the annular expanded wall of the conducting pipe, a tapered part is provided on the outer circumference of the sleeve between the enlarged diameter rear part and the small diameter front part, and a groove in which the suspending parts of the socket unit are initially set in engagement being formed in the outer circumference of the sleeve between said tapered part and said small diameter front part.

6. A piping connector according to claim 4, wherein the arm of the socket unit is formed of a wire spring and wherein the suspending parts are formed of a resin.

7. A piping connector comprising a conducting pipe having an end, an annular expanded wall spaced from the end and an annularly expanded stopper between the annular expanded wall and the end, a joint body having opposed front and rear ends, a chamber extending into the rear end dimensioned for accepting the annular expanded wall of the conducting pipe, notched widows formed through the joint body and communicating with the chamber, and a circulating hole extending into the front end of the joint body and communicating with the chamber, a generally tubular spacer having a large diameter rear part slidably disposed around the annular expanded wall of the conducting pipe and a small diameter front part slidably disposed around the pipe between the annular expanded wall and the stopper, a seal ring mounted around the conducting pipe and disposed between the spacer and the stopper, a sleeve slidingly mounted over the small diameter front part of the spacer, and a socket unit installed inside the chamber and in line with the notched windows of the joint body, the socket unit comprising a generally C-shaped arm made of an elastic material and a plurality of suspending parts protruding inwardly from the arm, the sleeve being mounted within the socket unit and holding the C-shaped arm of the socket unit in an expanded condition and at least partly protruding through the notched windows of the socket body, whereby insertion of the conducting pipe, the seal rings and the spacer into the chamber at the rear end of the joint body causes the spacer to engage the sleeve and urge the sleeve forwardly in the chamber, and whereby after sufficient insertion of the conducting pipe, the spacer and the sleeve into the chamber, the arm of the socket unit will resiliently return to an unexpanded condition such that the suspending parts thereof lockingly engage the annular expanded wall of the conducting pipe for holding the conducting pipe in the joint body.

* * * * *